US011587173B2

(12) United States Patent
Bland et al.

(10) Patent No.: US 11,587,173 B2
(45) Date of Patent: Feb. 21, 2023

(54) SYSTEMS AND METHODS FOR TRADING WITH MARKET DEPTH INFORMATION

(71) Applicant: FIDESSA TRADING UK LIMITED, London (GB)

(72) Inventors: Bruce Bland, Bucks (GB); Oleh Danyliv, London (GB); Daniel Nicholass, Carshalton (GB)

(73) Assignee: FIDESSA TRADING UK LIMITED, London (GB)

( * ) Notice: Subject to any disclaimer, the term of this patent is extended or adjusted under 35 U.S.C. 154(b) by 15 days.

(21) Appl. No.: 16/238,148

(22) Filed: Jan. 2, 2019

(65) Prior Publication Data

US 2019/0139145 A1 May 9, 2019

Related U.S. Application Data

(63) Continuation of application No. 14/250,048, filed on Apr. 10, 2014, now Pat. No. 10,217,166.

(60) Provisional application No. 61/810,359, filed on Apr. 10, 2013, provisional application No. 61/810,356, filed on Apr. 10, 2013.

(51) Int. Cl.
*G06Q 40/00* (2012.01)
*G06Q 40/06* (2012.01)
*G06Q 40/04* (2012.01)

(52) U.S. Cl.
CPC ............ *G06Q 40/06* (2013.01); *G06Q 40/04* (2013.01)

(58) Field of Classification Search
CPC .............................. G06Q 40/06; G06Q 40/04
See application file for complete search history.

(56) References Cited

U.S. PATENT DOCUMENTS

| 5,905,974 A | 5/1999 | Fraser et al. | |
| 2002/0111889 A1* | 8/2002 | Buxton | G06Q 40/00 705/35 |
| 2003/0200167 A1 | 10/2003 | Kemp, II et al. | |
| 2004/0024690 A1 | 2/2004 | Satow et al. | |
| 2005/0154668 A1 | 7/2005 | Burns et al. | |
| 2008/0103800 A1* | 5/2008 | Domenikos | G06Q 40/02 705/318 |

(Continued)

OTHER PUBLICATIONS

PowerZoneTrading (Bar Analyzer for TradeStation User Guide, Oct. 2013 https://web.archive.org/web/20131007003023/http://www.powerzonetrading.com/baranalyzer-help) (Year: 2013).*

(Continued)

*Primary Examiner* — Mike Anderson
*Assistant Examiner* — Mark H Gaw
(74) *Attorney, Agent, or Firm* — Baker Botts L.L.P.

(57) ABSTRACT

Techniques for displaying market depth information for a financial instrument including a plurality of bid and ask order metrics at corresponding prices. A graphical representation of the market depth information, with axes corresponding to order metrics and price, is aligned with an expected profile, including an expected metric corresponding to one or more metrics including, for example, bid and ask order volume, order count, or order consideration, generated based on the market depth information. The graphical representation of the market depth information and the expected profile are displayed using a display device.

16 Claims, 5 Drawing Sheets

(56) References Cited

U.S. PATENT DOCUMENTS

| | | | |
|---|---|---|---|
| 2008/0183639 A1* | 7/2008 | DiSalvo | G06Q 40/06 705/36 R |
| 2008/0243669 A1 | 10/2008 | Driscoll et al. | |
| 2014/0310201 A1 | 10/2014 | Bland et al. | |
| 2014/0310202 A1 | 10/2014 | Bland et al. | |

OTHER PUBLICATIONS

U.S. Appl. No. 14/250,048 (U.S. Pat. No. 10/217,166), filed Apr. 10, 2014 (Feb. 26, 2019).
U.S. Appl. No. 14/250,075 (U.S. Pat. No. 9,959,573), filed Apr. 10, 2014 (May 1, 2018).
U.S. Appl. No. 15/928,898 (US 2018/0211325), filed Mar. 22, 2018 (Jul. 26, 2018).
U.S. Appl. No. 14/250,048, filed Jan. 2, 2019 Issue Fee Payment.
U.S. Appl. No. 14/250,048, filed Oct. 3, 2018 Notice of Allowance.
U.S. Appl. No. 14/250,048, filed Apr. 16, 2018 Applicant Initiated Interview Summary.
U.S. Appl. No. 14/250,048, filed Apr. 3, 2018, Amendment and Request for Continued Examination (RCE).
U.S. Appl. No. 14/250,048, filed Feb. 14, 2018 Final Office Action.
U.S. Appl. No. 14/250,048, filed Dec. 18, 2017 Response to Non-Final Office Action.
U.S. Appl. No. 14/250,048, filed Nov. 14, 2017 Non-Final Office Action.
U.S. Appl. No. 14/250,048, filed May 4, 2017 Amendment and Request for Continued Examination (RCE).
U.S. Appl. No. 14/250,048, filed Feb. 9, 2017 Final Office Action.
U.S. Appl. No. 14/250,048, filed Dec. 22, 2016 Response to Non-Final Office Action.
U.S. Appl. No. 14/250,048, filed Aug. 23, 2016 Non-Final Office Action.
U.S. Appl. No. 14/250,048, filed Mar. 11, 2016 Amendment and Request for Continued Examination (RCE).
U.S. Appl. No. 14/250,048, filed Dec. 16, 2015 Final Office Action.
U.S. Appl. No. 14/250,048, filed Nov. 12, 2015 Response to Non-Final Office Action.
U.S. Appl. No. 14/250,048, filed Aug. 13, 2015 Non-Final Office Action.
U.S. Appl. No. 14/250,072, filed Mar. 23, 2018 Issue Fee Payment.
U.S. Appl. No. 14/250,072, filed Jan. 8, 2018 Notice of Allowance.
Niles, Robert ("Statistics I Standard Deviation" Robert Niles, http://www.robertniles.com/stats/stdev.shtml Jul. 1, 2004).
Stockburger, David ("Introductory Statistics: Concepts, Models, and Applications: Regression Models" http://www.psychstat.missouristate.edu/introbooklsbk16m.htm Apr. 27, 2006).
Zukerman, Erez ("How to Create Progress Bars in Excel With Conditional Formatting" Howtogeek.com http://www.howtogeek.com/howto/45677/how-to-create-progress-bars-in-excel-with-conditional-formatting/ Jan. 8, 2012).
U.S. Appl. No. 14/250,072, filed Jul. 7, 2017 Amendment and Request for Continued Examination (RCE).
U.S. Appl. No. 14/250,072, filed May 8, 2017 Final Office Action.
U.S. Appl. No. 14/250,072, filed Feb. 21, 2017 Response to Non-Final Office Action.
U.S. Appl. No. 14/250,072, filed Feb. 9, 2017 Applicant Initiated Interview Summary.
U.S. Appl. No. 14/250,072, filed Nov. 21, 2016 Non-Final Office Action.
U.S. Appl. No. 14/250,072, filed Mar. 11, 2016 Amendment and Request for Continued Examination (RCE).
U.S. Appl. No. 14/250,072, filed Dec. 18, 2015 Final Office Action.
U.S. Appl. No. 14/250,072, filed Nov. 12, 2015 Response to Non-Final Office Action.
U.S. Appl. No. 14/250,072, filed Aug. 13, 2015 Non-Final Office Action.

* cited by examiner

SYSTEMS AND METHODS FOR TRADING WITH MARKET DEPTH INFORMATION

CROSS-REFERENCE TO RELATED APPLICATIONS

This application is related to U.S. Provisional Application Ser. No. 61/810,356, filed Apr. 10, 2013, U.S. Provisional Application Ser. No. 61/810,359, filed on Apr. 10, 2013, and U.S. patent application Ser. No. 14/250,048, filed Apr. 10, 2014, now allowed, each of which is incorporated herein by reference in its entirety and from each of which priority is claimed.

BACKGROUND

The disclosed subject matter relates to techniques for displaying market depth information.

Traders engaged in the trading of market instruments can utilize software products that provide various graphical user interfaces to display market price data, execute orders and monitor status of different market conditions. Market instruments can include anything that can be traded in some quantity for a particular price. For example, a market instrument may be goods or financial products (e.g., stocks, bonds, futures, currency, commodities, or other financial instruments). Market instruments may be "real" and listed on an exchange or "synthetic," such as a combination of real products.

Electronic trading of market instruments has been embraced as the means for buying and selling instruments in various market exchanges throughout the world. Traders can communicate with host computers of the market exchanges or other intermediary host computers coupled with the exchanges via personal computer or mobile device. Electronic trading allows for display of information regarding market instruments received from the host computer which can impact the decision making process of the trader with regard to placing trade orders.

The speed at which traders can competitively place an order can be important. For example, a trader engaged in electronic trading may decide to wait or fill an order based on the information made available to them through the electronic trading application. Even a marginal increase in speed during such process can yield significant returns for traders. Conversely, a failure to competitively fill an order in a timely manner can potentially result in significant monetary losses accumulated over time.

Traders engaged in electronic trading often process and absorb voluminous market information made available to them while trading. Certain exchanges can be fast-paced, fluid environments where price, quantity, and other market criteria constantly fluctuate within a short period of time. One type of information about a market instrument that can be important to a trader is known as market depth (i.e., the quantities of the market instrument available at particular prices). Certain conventional techniques for display of market depth information, such as tables or charts that depict the current market depth and change as new trade orders are placed on the exchange, can be cumbersome and difficult to read. Such conventional techniques can fail to provide a display of market depth that is sufficient to identify unusual trading patterns. Additionally, such conventional techniques can fail to provide a display of market depth history, which can be beneficial in certain decisions to trade a market instrument—for instance, that information can help traders to avoid submitting orders at prices for which large volumes already exist in the market, as trading ahead of these would have a considerably greater chance of execution Accordingly, there is a need for improved techniques for the display of market depth to provide advantages to a trader, including, for example, the identification of unusual trading patterns, and/or the display of historical market depth for a market instrument.

SUMMARY

The disclosed subject matter provides techniques for displaying market depth information, and more particularly to techniques for displaying market depth information for identification of unusual trading patterns.

In one aspect of the disclosed subject matter, a system for displaying market depth information includes a computing device including one or more processors configured to receive market depth information for a market instrument. The market depth information includes a plurality of bid and ask order metrics at corresponding prices of the market instrument, and the computing device is configured to generate a graphical representation of the market depth information having a first axis corresponding to the bid and ask order metrics of the market instrument and a second axis corresponding to price of the market instrument. The computing device is configured to generate an expected profile including an expected metric corresponding to one or more of the plurality of bid and ask order metrics based on at least the market depth information. The computing device is configured to align the expected profile along the second axis of the graphical representation of the market depth information, whereby one or more expected metrics are superimposed over corresponding bid and ask order metrics. The system includes a display device, coupled with the computing device, adapted to display the graphical representation of the market depth information and the expected profile.

In certain embodiments, the computing device can be further configured to receive market depth information for the market instrument from a plurality of sources. The plurality of bid and ask order metrics can include order volume at for corresponding prices, number of orders available at corresponding prices, and/or consideration of orders available at corresponding prices. The expected metric can be expected volume, expected number of orders, and/or expected consideration of orders. Additionally or alternatively, the computing device can be further configured to calculate a standard deviation from the expected profile and generate error bars corresponding to a highest and lowest expected metric for each bid and ask order metric.

In certain embodiments, the bid and ask order metrics can include a plurality of bid and ask order volumes, the first axis can correspond to volume of the market instrument, and the expected profile can include an expected volume corresponding to the plurality of bid and ask order volumes. The graphical representation of the market depth information can include a bar graph, and the computing device can be configured to split the second axis into intervals corresponding to price and, for each of said intervals, generate a graphical bar extending along the first axis by a distance corresponding to a total order volume for the price interval. Additionally, the computing device can be further configured to compare the expected profile with the market depth information and identify a price at which the difference between the available volume corresponding to the price and the expected profile is greatest.

In certain embodiments, the computing device can be further configured to generate the expected profile by processing the received market depth information and generating a distribution curve of bids and a distribution curve of asks. The computing device can be configured to generate the distribution curve of bids or the distribution curve of asks by applying regression analysis on the available volumes and the available prices. Additionally and/or alternatively, the computing device can be configured to generate the distribution curve of bids or the distribution curve of asks by calculating a weighted average of the available volumes and the available prices.

In certain embodiments, the system can further include an input device, coupled to the computing device, for accepting an input from a trader for an order at a selected price. The computing device can be further configured to determine a volume for the order based on the difference between the available volume at the selected price and the expected profile if the available volume is lower than the expected profile. The input device can be a mouse and the computing device can be configured to detect a click by the trader on a location of the second axis corresponding to the selected price. The computing device can be further configured to launch an instant order corresponding to the selected price upon detecting the click by the trader. Additionally or alternatively, the computing device can be further configured to display on the display device a trade entry dialog for confirmation or alteration of order details upon detecting the click by the trader.

In another aspect of the disclosed subject matter, a method for displaying market depth information includes receiving, at a computing device coupled with a display device, market depth information for a market instrument. The market depth information includes a plurality of bid and ask order metrics at corresponding prices of the market instrument. The method includes generating a graphical representation of the market depth information having a first axis corresponding to the bid and ask order metrics of the market instrument and a second axis corresponding to price of the market instrument. The method includes generating an expected profile including an expected metric corresponding to one or more of the plurality of bid and ask order metrics based on at least the market depth information. The method includes aligning the expected profile along the second axis of the graphical representation of the market depth information, whereby one or more expected metrics are superimposed over corresponding bid and ask order metrics, and displaying, with the display device, the graphical representation of the market depth information and the expected profile.

In certain embodiments, receiving market depth information for the market instrument can include receiving market depth information from a plurality of sources. The plurality of bid and ask order metrics can include order volume at corresponding prices, number of orders available at corresponding prices, and/or consideration of orders available at corresponding prices. The expected metric can include volume, expected number of orders, and/or expected consideration of orders. Additionally and/or alternatively, the method can further include calculating a standard deviation from the expected profile and generating error bars corresponding to a highest and lowest expected metric for the bid and ask order metrics.

In certain embodiments, the bid and ask order metrics can include a plurality of bid and ask order volumes, the first axis can correspond to volume of the market instrument, and the expected profile can include an expected volume corresponding to one or more of the plurality of bid and ask order volumes. Generating the graphical representation of the market depth information can include generating a bar graph, whereby the second axis corresponding to price is split into intervals and each interval is associated with a graphical bar extending along the first axis by a distance corresponding to a total order volume for the price interval. The method can further include comparing, with the computing device, the expected profile with the market depth information and identifying a price at which the difference between the available volume corresponding to the price and the expected profile is greatest.

In certain embodiments, generating the expected profile can include processing, with the computing device, the received market depth information and generating a distribution curve of bids and a distribution curve of asks. Generating the distribution curve of bids or the distribution curve of asks can include applying regression analysis on the available volumes and the available prices. Additionally or alternatively, generating the distribution curve of bids or the distribution curve of asks can include calculating a weighted average of the available volumes and the available prices.

In certain embodiments, the method can further include accepting an input from a trader for an order at a selected price and determining a volume for the order based on the difference between the available volume at the selected price and the expected profile if the available volume is lower than the expected profile. Accepting the input from the trader can include detecting a click by the trader on a location of the second axis corresponding to the selected price. Accepting the input from the trader can further include launching an instant order corresponding to the selected price. Additionally or alternatively, accepting the input from the trader can further include displaying a trade entry dialog for confirmation or alteration of order details.

In another aspect of the disclosed subject matter, a method for displaying market depth information includes generating a graphical representation of order volume in a market for a market instrument at a plurality of prices for the market instrument. The method includes generating an expected profile including an expected volume corresponding to each of the plurality of prices. The method includes superimposing the expected profile on the graphical representation of order volume at the plurality of prices, and displaying the superimposed expected profile to indicate a difference in expected volume at each of the plurality of prices.

Figure 1:
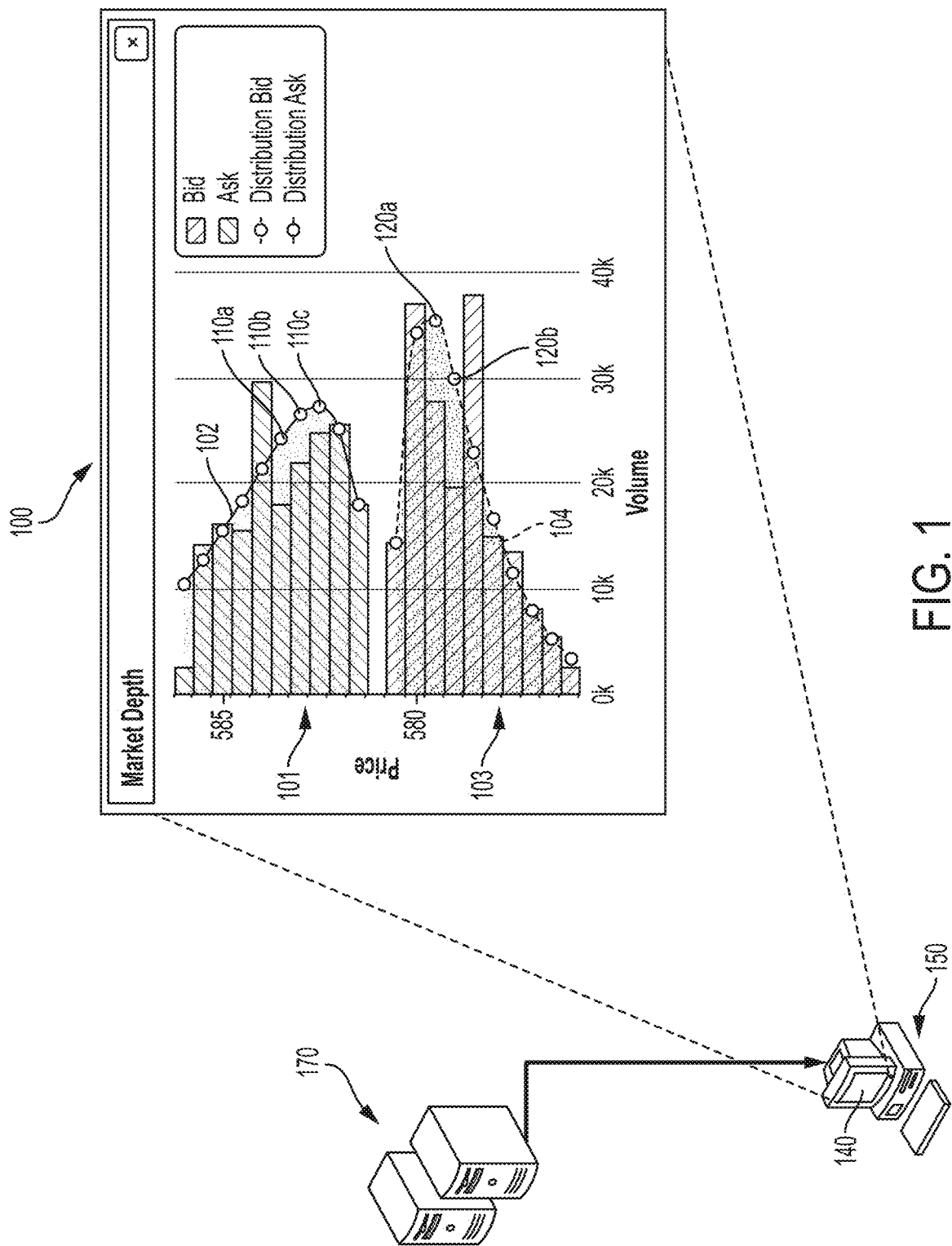
FIG. 1 is a schematic representation of a system for displaying market depth information of a market instrument in accordance with an embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

Exemplary embodiments of the disclosed subject matter are described below, with reference to the figures, for purposes of illustration, and not limitation.

In one aspect of the disclosed subject matter, systems and methods for displaying market depth information include generating an expected profile including an expected metric corresponding to one or more bid and ask order metrics included in market depth information for a market instrument. For purpose of clarity, and not limitation, exemplary embodiments of the systems and methods of this aspect of the disclosed subject matter will be described concurrently with reference to FIG. 1 and FIG. 2. In an exemplary and non-limiting embodiment, with reference to FIG. 1, a system for displaying market depth information can include a computing device 150 including one or more processors, which can be configured to receive market depth information for a market instrument. Although described with reference to FIG. 1 in connection with computing device 150, one of skill in the art will appreciate the techniques disclosed herein can be implemented in any combination of software, general-purpose hardware, and special purpose hardware. The computing device 150 can include, for example, a stand-alone computer, mobile computing devices, a server, server cluster, distributed computing system, a cloud-based computing system, or the like. The computing device can be connected to a network, such as the internet or an intranet, for receiving (210) the market depth information.

As used herein, market depth information refers to quantities of the market instrument available at particular prices, including "consolidated market depth" information when the volume from different exchanges is aggregated. That is, the market depth information can be received from, for example, one or more host computers corresponding to an exchange 170. Additionally or alternatively, the market depth information can be received from one or more computing devices associated with an entity providing market data, such as a broker or other third party provider of market data. It is recognized that market depth information can be retrieved by the computing device 150 directly from multiple trading venues or other providers of market data, or from an intermediary after aggregation of market data. It is also recognized that the extent of the market depth available to a trader for a market instrument can depend on the exchange.

For purpose of explanation, and not limitation, exchanges typically maintain a listing of orders for each financial instrument traded on the exchange. An order can be an offer to buy (e.g., a bid order) or sell (e.g., a sell order) a specified number of shares of a financial instrument at an identified price. As used herein, an order can include, without limitation, a market order (i.e., an order to buy or sell a financial instrument immediately at the best available price), a stop order (i.e., an order that will be executed as a market order when the market price of the financial instrument rises to surpass the identified price), a limit order (i.e., an order that will only be executed as the identified price or within an identified price range), or any other order type. Many exchanges and other trading venues publish market data information, referred to as level 2 market data, that provide updates as orders are added, removed, or changed.

The publishing of this market depth information typically includes either the publishing of full order depth or price aggregated market depth. Full order depth market information can include individual orders for the financial instrument along with corresponding metrics, whereas price aggregated market depth can include metrics corresponding to identified price levels. Recipients of full order depth market information can process the received information as desired, for example, to split the orders into price intervals and corresponding metrics. One of skill in the art will appreciate, however, that market depth information can be received in other formats and/or from multiple sources, and can be processed by recipients in other manner.

As described herein, the market depth information can include a plurality of bid and ask order metrics at corresponding prices of the market instrument. As used herein, order metrics can include, for example, the volume at particular prices. It is recognized that market depth information is typically provided in this manner. However, order metrics can also include order count (i.e., the number of orders available at corresponding prices), and/or consideration (i.e., the volume at particular prices multiplied by the prices). For purpose of illustration, and not limitation, exemplary embodiments are described herein with reference to order volume particular prices. It is appreciated, however, that the techniques disclosed herein can also apply to other order metrics, such as order count and/or consideration.

The computing device 150 can be configured to generate (220) a graphical representation 100 of the market depth information having a first axis corresponding to the bid and ask order metrics of the market instrument and a second axis corresponding to price of the market instrument. For example, the computing device 150 can include one or more processors, one or more memories, and networking hardware for receiving the market depth information. The one or more processors of the computing device can be adapted to display, on the display device 140, a bar graph. As depicted in FIG. 1, the bar graph can be a horizontal bar graph 100, with the x-axis of the bar graph can represent volume. It is recognized that, in connection with certain embodiments, the x-axis can also represent order count and/or consideration. The y-axis can correspond to the price of the market instrument. One of skill in the art will appreciate that other graphical representations may be used instead of a bar graph 100, and that the axes can be varied as desired. The price can be split into intervals. The size of the price interval can be, for example, the tick size, which can be provided by the trading venue or exchange. The volume of the market instrument available at each price interval can be displayed, as depicted in FIG. 1 as a bar. For example, the length of the bar can correspond to the volume available at a price interval. The volumes corresponding to bids (103) and asks (101) can be separated by a divider, and can be displayed in different colors for ease of visualization.

As embodied herein, the computing device can be configured to generate (230) an expected profile including an expected metric corresponding to one or more of the plurality of bid and ask order metrics based on at least the market depth information, and align (240) the expected profile along the second axis of the graphical representation of the market depth information, whereby one or more expected metrics are superimposed over corresponding bid and ask order metrics. For example, with reference to FIG. 1 and in connection with an exemplary embodiment, an expected profile for bids 104 and asks 102 can be generated given the current market depth prices and volumes and can be displayed over the volume bars. For example, the one or more processors of the computing device can be configured to process the received market depth information and generate a distribution of bids and a distribution of asks. This distribution can be generated, for example, using one or more of regression techniques, such as least squares or polynomial regression, weighted averaging, and/or other suitable techniques known to those skilled in the art. The resulting graphical representation of the market depth information and the expected profile can be displayed (260) with a display device coupled to the computing device.

For purpose of illustration, and not limitation, an exemplary process for calculating an expected profile is provided with reference to Table 1. Table 1 provides a simplified tabular representation of market depth information for a fictitious financial instrument, with order quantity (i.e., number of shares) divided into price intervals of 5 and further categorized as bid orders and ask orders.

TABLE 1

| Bid Quantity (BQ) | Price (P) | Ask Quantity (AQ) |
|---|---|---|
| 200 | 120 | |
| 800 | 115 | |
| 1250 | 110 | |
| 1000 | 105 | |
| | 100 | 400 |
| | 95 | 800 |
| | 90 | 1350 |
| | 85 | 800 |
| | 80 | 200 |
| | 75 | 100 |

In connection with this example, an expected profile for bid quantity can be calculated by performing regression analysis on the bid quantities relative to corresponding prices. For example, and not limitation, the computing device can be configured to perform arbitrarily dimensioned polynomial regression, e.g., taking the form of $BQ(P)=\beta_1 \times P + \beta_2 \times P^2 + \beta_3 ' P^3 + \beta_4$, where $\beta_1 \ldots \beta_4$ are the regression coefficients. In this example, the regression coefficients for the bid orders can be calculated as $\beta_1 = 29662$; $\beta_2 = -256$; $\beta_3 = 0.777$; $\beta_4 = -1\mathrm{e}{+6}$. From these coefficients, a distribution curve can be calculated continuously over a desired range. Similarly, regression can also be performed on the ask quantities in a similar fashion.

In certain embodiments, the computing device can be further configured to calculate a standard deviation from the expected profile and generate error bars corresponding to a highest and lowest expected metric for each bid and ask order metric. For example, where the graphical representation includes an axis corresponding to order volume, the computing device can calculate a standard deviation from the expected profile and determine a highest and lowest expected volume at each price interval. The highest and lowest expected volume can be displayed as error bars around the expected profile.

Display of the expected profile can facilitate the identification of unusual or aberrational volumes available at certain prices. For example, the expected bid profile 104 can facilitate the identification (250) of prices at which the available bid volume diverges from the expected profile (e.g., 120a and 120b). Likewise, the expected ask profile 102 can facilitate the identification prices at which the available ask volume diverges from the expected profile (e.g., 110a, 110b, and 110c).

For purpose of illustration, and not limitation, identification (250) of unusual or aberrational volumes can be used by a trader to determine the price at which bids or asks should be placed. For example, a trader may wish to identify prices at which volume may be added to the depth without signaling trading intentions to the market. In accordance with the disclosed subject matter, the expected profile of bids 104 can be displayed such that prices with available volume below the expected profile (120a and 120b) can be easily identified. Such techniques can improve trading profitability as well as improve price-time priority queue positions. In an exemplary embodiment of the disclosed subject matter, the one or more processors of the computing device can further be configured to identify a suggested price point 120a at which the difference between the available volume at that price and the expected profile is greatest, thereby identifying for the trader a price at which additional volume can be added without signaling trade intentions.

As embodied herein, the one or more processors of the computing device can further be configured to accept input (270) from a trader for new orders at a particular price. For example, the bar graph can include one or more buttons or links adapted to accept user input corresponding to a desired trade price. Clicking on a price can cause the one or more processors to launch a trade entry dialog or instant order for the selected price point (280). In an exemplary embodiment, the volume for the order can be given as the difference between the available volume at the selected price and the expected profile if the volume is lower than the expected profile.

Additionally, for purpose of illustration and not limitation, the computing device can further be configured to demarcate, on the graphical representation, the position and size of a trader's outstanding orders already placed into the market depth. For example, in connection with embodiments in which order volume is displayed as a bar graph, the price intervals corresponding to the trader's pending orders can be displayed as a stacked bar with the trader's order volume displayed in a different color. Additionally or alternatively, the trader's pending orders can be demarcated with a graphical symbol or text proximate corresponding prices. The management of these existing market orders may also be carried out from this display.

Techniques for displaying market depth information can further include updating the bar graph at periodic time intervals (e.g., continuously updating the display 260). The one or more processors of the computing device can be configured to update the bar graph upon receipt of market depth information (210) for the next time interval.

The techniques disclosed herein provide for an organized display of market depth information which allows for enhanced visualization and identification of unusual volumes or trading patterns at price intervals. Accordingly, the techniques disclosed herein can provide a trader with the ability to efficiently and accurately place orders for market instruments in an electronic trading environment.

In another aspect of the disclosed subject matter, systems and methods for displaying market depth information include generating a graphical representation of market depth information including associated time information. For purpose of clarity, and not limitation, exemplary embodiments of the systems and methods of this aspect of the disclosed subject matter will be described concurrently with reference to FIG. 3, FIG. 4, and FIG. 5.

Figure 3:
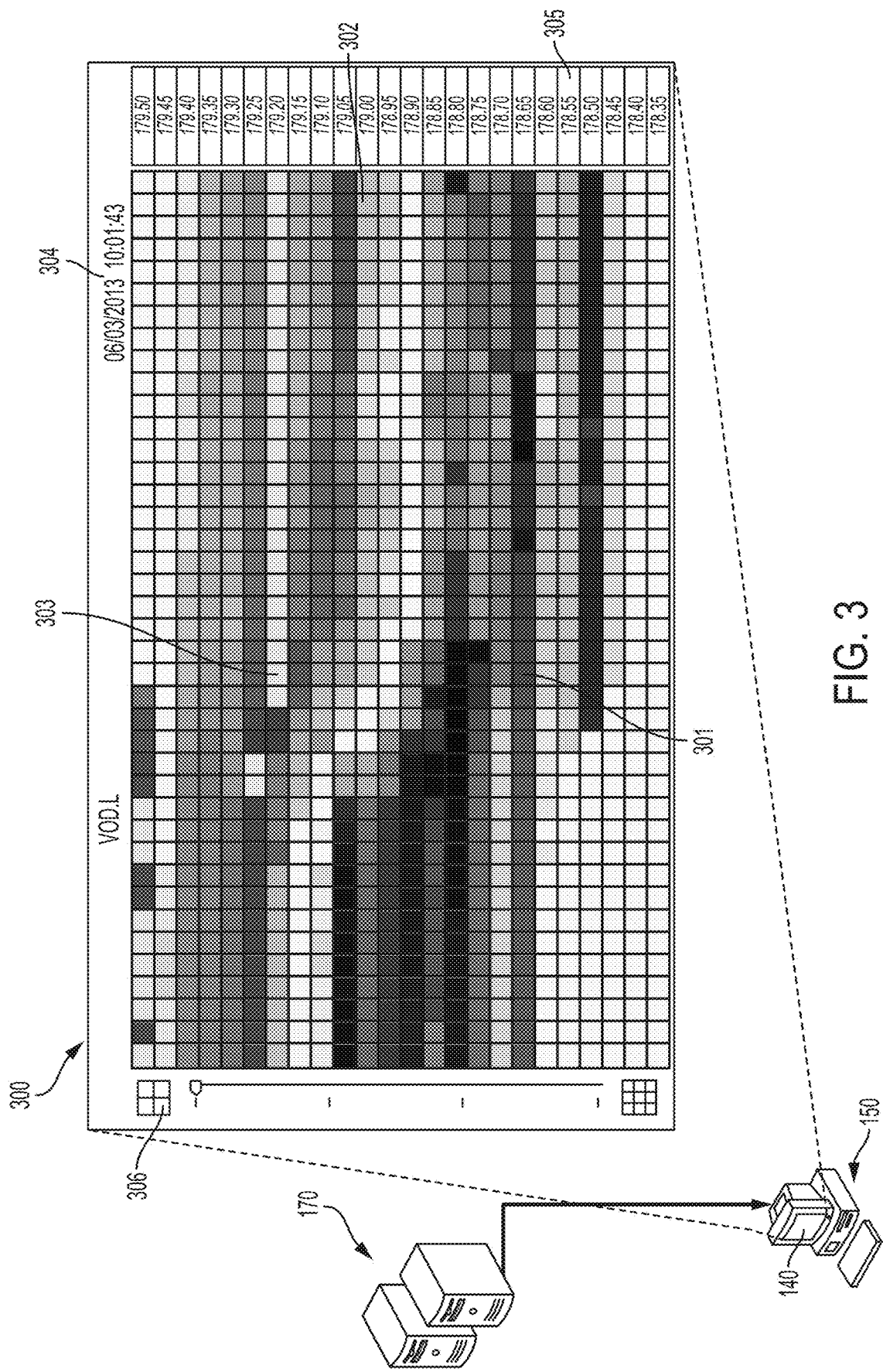
FIG. 3 is a schematic representation of a system for displaying historical market depth information of a market instrument in accordance with an embodiment of the disclosed subject matter.

In an exemplary and non-limiting embodiment, with reference to FIG. 3, a system for displaying market depth information can include a computing device 150, including one or more processors, which can be configured to receive market depth information for a market instrument. The computing device 150 can include the same components as that described with reference to FIG. 1, and can likewise be connected to a network for receiving (510) the market depth information. As noted above, although described with reference to computing device 150, the techniques disclosed herein can be implemented in any combination of software, general-purpose hardware, and special purpose hardware.

As described above, market depth information can be published by exchanges or other parties that have access to such information and can be provided in a variety of forms. In some instances, market depth information provided by an exchange or other source can include time data corresponding to orders or order volume and price. For example, when a new order is placed on an exchange, the exchange may notify subscribers of the number of shares and price of the order along with a timestamp indicating the time at which the exchange received the order. Additionally or alternatively, the exchange may aggregate orders and periodically provide subscribers with updates including information about the time one or more orders has been pending.

In instances in which the exchange or other source of market depth information does not provide information regarding the time of orders, time information may be derived based on the time the market depth information is sent to subscribers. For example, if an exchange provides updates to subscribers when new orders are submitted without a corresponding timestamp, a subscriber may record the time at which the update was received. For price aggregated market depth information, where an exchange provides periodic updates including aggregated volume for price intervals, subscribers may compare volume at each price interval of an update to a previous update and determine the new volume added over the interval between updates. One of skill in the art will further appreciate that time information related to an order book may also be provided and/or derived in a variety of other suitable manners.

In connection with this aspect of the disclosed subject matter, the market depth information can include a plurality of bid and ask order metrics at corresponding prices of the market instrument and associated time information. Such metrics can include, without limitation, the volume at particular price, order count, and/or consideration. For purpose of illustration, and not limitation, exemplary embodiments are described herein with reference to order volume at particular prices. It is appreciated, however, that the techniques disclosed herein can also apply to other order metrics, such as order count and/or consideration.

The computing device 150 can be configured to generate (520) a graphical representation 300 of the market depth information having a first axis corresponding to time and a second axis corresponding to price of the market instrument. In an exemplary and non-limiting embodiment, the computing device 150 can be configured to split the first axis into time intervals and split the second axis into price intervals, such that the graphical representation of the market depth information includes a two-dimensional grid indexed by time interval and price interval, and the color gradient at each location within the grid corresponds to a volume over the corresponding time interval.

Figure 4:
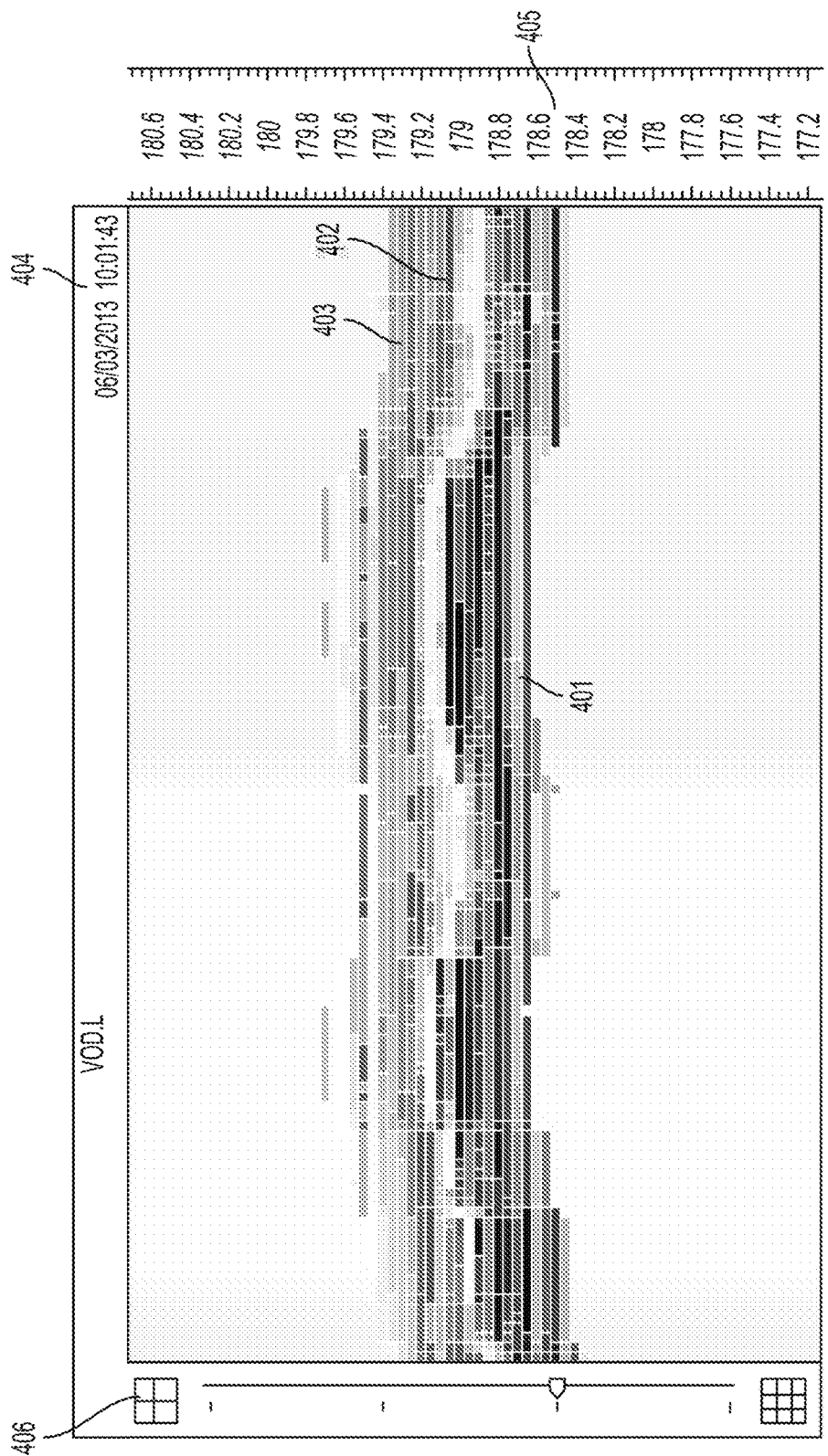
FIG. 4 illustrates an exemplary zoomed-out historical market depth display in accordance with an embodiment of the disclosed subject matter.

For example, as illustrated in FIG. 3 and FIG. 4, the graphical representation can take the form of a plot having an x-axis and a y-axis, with the x-axis representing time. The time axis can be split into predetermined intervals. The y-axis can correspond to the price of the market instrument.

The price can likewise be split into intervals. The size of the price interval (305, 405) can be, for example, the tick size, which can be provided by the trading venue or exchange. The volume of the market instrument available at each price within each time interval can be displayed. As embodied herein, if volume is changed during a time interval, the volume displayed can be the volume available at the beginning of the time interval, the average volume, the volume at the end of the time interval, or any other suitable measure of volume corresponding to that time interval.

The computing device 150 can be configured to generate (530) a color gradient corresponding to one or more of the bid and ask order metrics based on the market depth information and align (540) the color gradient corresponding to a bid or ask order metric at a corresponding location along the first axis and second axis of the graphical representation of the market depth information. That is, for example, the volume of the market instrument available at each price interval and each time interval can be displayed by determining a color gradient value (e.g., a level of opacity) and displaying a representation of the determined color gradient over the region of the plot (e.g., 301 and 401) corresponding to a price interval and time interval. For example, in one embodiment, high volume can correspond to a strong color and low volume can correspond to weak color. The volume available at each price interval and each time interval can be represented by a gradient of color which can be different for a bid and an ask (302, 402). For example, bid volumes can be shown in red, and ask volumes can be shown in blue. As an alternative or in addition to color, greyscale, or other display objects that can convey gradient, could also be used. The resulting graphical representation of the market depth information and the color gradients can be displayed (560) with a display device 140 coupled to the computing device.

For purpose of illustration, and not limitation, generating a color gradient can include mapping one or more bid and ask order metrics to a numerical value representative of color. For example, as will be appreciated by one of ordinary skill in the art, color can be represented numerically a combination of red, green, and blue values, often referred to as RGB color. Each of the red, green, and blue color values are defined by an integer between 0 and 255 (or a hex value between 0x00 and 0xFF), such that any given color can be represented as a value between RGB(0, 0, 0) (or 0x000000; black) and RGB(255, 255, 255) (or 0xFFFFFF; white). In connection with an embodiment in which bid volumes are shown in red (which can be represented as RGB(255, 0, 0)), a color gradient for a particular bid volume can be generated by determining a percentile for the particular bid volume. The red value can be set according to this percentile. For example, a bid volume in the first percentile (e.g., within the top 10% of order volumes) can correspond to red value of 255, a bid volume within the second percentile (e.g., within the top 20% to 10% of all order volumes) can correspond to a red value of 200, and the last percentile (e.g., within the bottom 10%) can correspond to a red value of 10. One of skill in the art will appreciate that the number and grouping of percentiles can be varied as desired.

Additionally, one of skill in the art will appreciate that color can also be represented as a base color and an alpha blending parameter. The alpha blending parameter can be an integer between 0 and 255 that corresponds to the amount of transparency of the color. For example, if the base color is red, e.g., RGB(255, 0, 0), and the alpha blending parameter is 25, the resulting color can be red with a transparency of about 10% (e.g., RGB(10, 0, 0)). In this manner, generating a color gradient for a particular bid order volume including determining the alpha blending parameter, e.g., by percentile. One of skill in the art will appreciate that a variety of other suitable techniques exist for generating a color gradient, and that the disclosed subject matter is not intended to be limited to the examples disclosed herein.

In connection with certain embodiments, unusual or aberrational volumes available at certain prices and times can be identified (550). Identification of unusual or aberrational volumes can be accomplished with reference to predetermined criteria entered by a trader or other mathematical techniques. These identified aberrational volumes can be displayed by coloring corresponding to regions on the plot (e.g., 103, 203) with a color different from the bid/ask palette. For example, the regions corresponding to aberrational volumes can be represented as aqua.

Identification of unusual or aberrational volumes can include utilization of the techniques disclosed herein for generating an expected profile. For example, an expected profile can be calculated for one or more of the time intervals within the grid using the techniques disclosed herein. An expected volume for each price interval within a given time interval can be determined, and aberrational volumes can be identified by comparing the expected volumes with the volumes at corresponding display locations. For example, and not limitation, a particular location within the grid can be assigned a particular color if the different between the expected volume and the actual volume surpasses a predetermined threshold. In an exemplary embodiment, techniques such as regression analysis, percentiles, z-scores, or the like can be used to compute the color and/or color gradient of locations within the grid that have been identified as corresponding to aberrational volume, as would be understood by one of ordinary skill in the art. For example, an aberrational volume color is colored dark red using an RGB value of (255,0,0) when the volume is within the top 1% of volumes currently on display on the grid. Another example would be coloring aberrational volume when the calculated Z-Score is greater than 5.

Techniques for displaying market depth information can further include displaying indicative date and time of the last time interval 304, 404. Additionally or alternatively, time stamps can be displayed along the x-axis. The one or more processors of the computing device 150 can be configured to scroll (515) the plot area each time interval (e.g., from right to left) to record a historical market depth profile as time moves forward, thereby creating a "snail trail" of the price. To further enhance the organization and representation of the market depth information, grid lines can be displayed at the border of each time/price interval as shown in FIG. 3.

In connection with an exemplary embodiment, the one or more processors of the computing device can further be configured to zoom and/or pan the plot area. For example, the plot area can include buttons (306, 406) and/or a scroll bar adapted to accept user input (570) corresponding to a desired zooming action. As illustrated by FIG. 4, the plot area can be displayed in a zoomed-out fashion, thereby allowing visualization of a longer time period and showing more price intervals.

Figure 2:
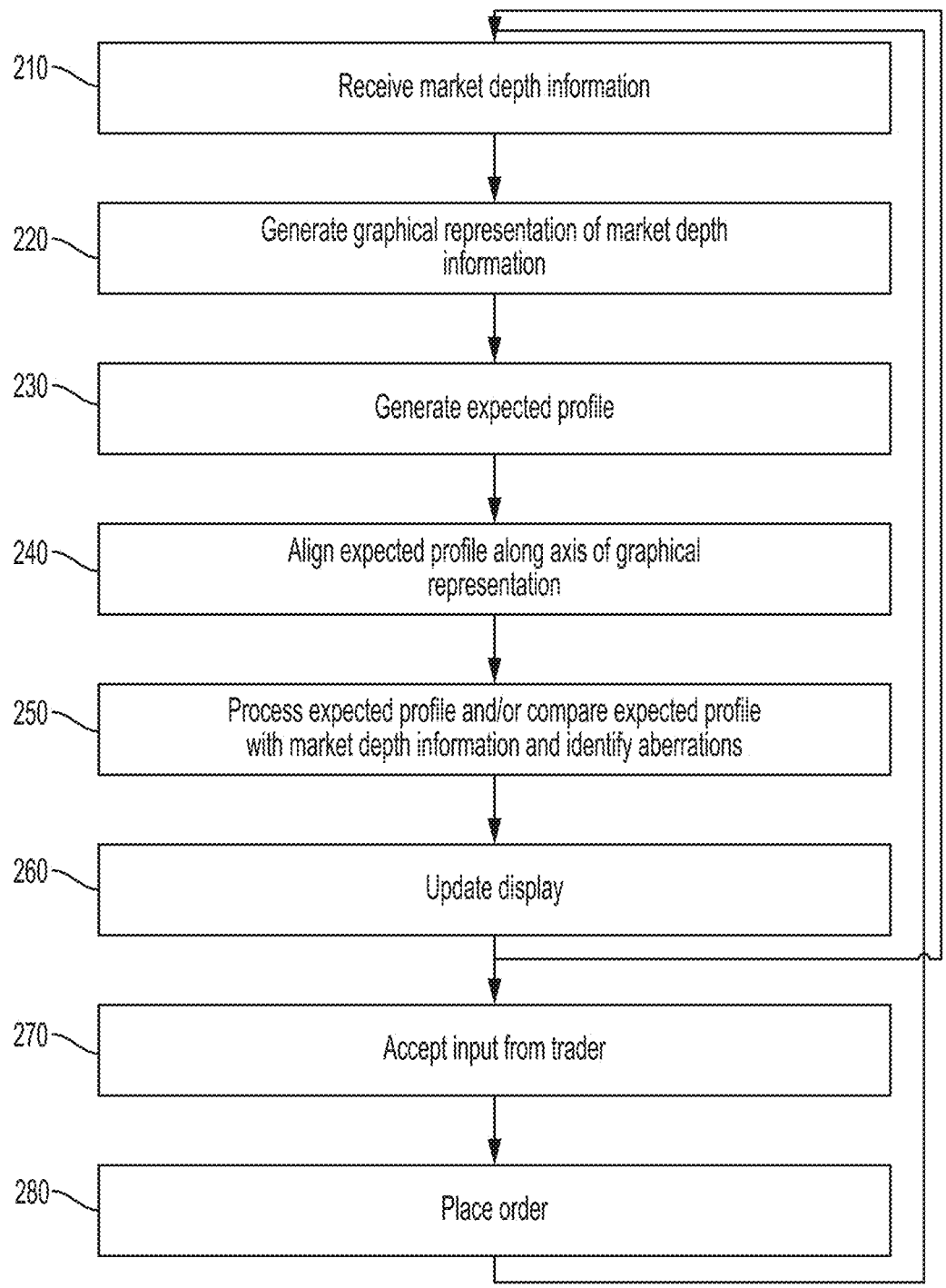
FIG. 2 is a flow diagram of a method for displaying market depth information of a market instrument in accordance with an embodiment of the disclosed subject matter.

In certain embodiments, the computing device 150 can be further configured to accept input (570) from the trader for an order at a selected price and submit said order at said selected price, as described herein with reference to FIG. 1 and FIG. 2. For example, the computing device can allow placement of new market order (580) when a trader clicks on a selected price shown either in the grid or on the axis. The grid can also be adapted to display graphical indications of the trader's orders in the historical order book. For example, locations within the grid in which the trader has placed an order can be colored using a different color palette than those used for the bid, ask, and/or aberrational volume locations.

The techniques disclosed herein provide for an organized display of historical market depth information which allows for enhanced visualization of complex market depth information in an easy to use system. Accordingly, the techniques disclosed herein can provide a trader with the ability to efficiently and accurately place orders for market instruments in an electronic trading environment, and visualize their own market orders within the historic time frame chosen.

Figure 5:
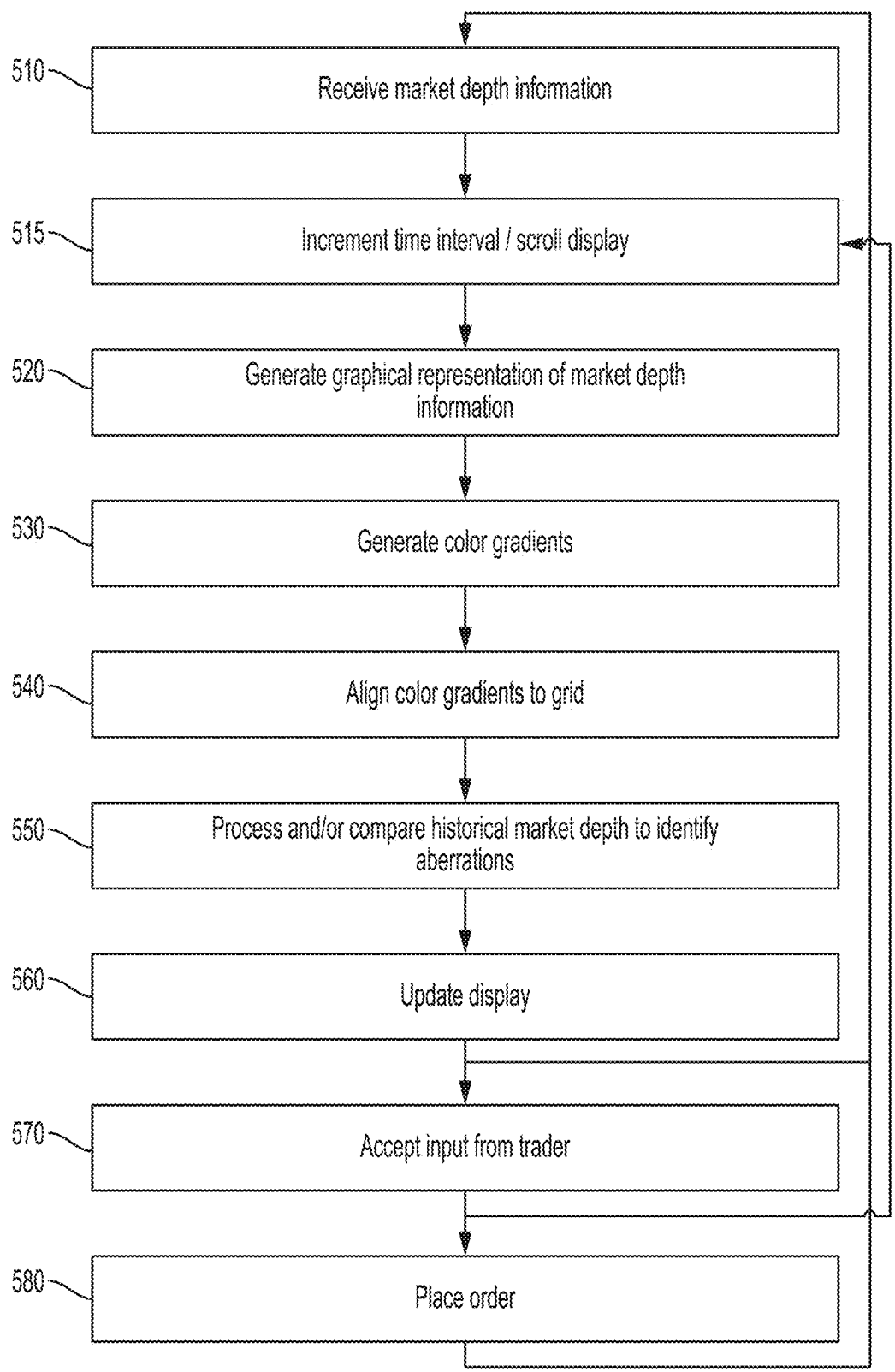
FIG. 5 is a flow diagram of a method for displaying historical market depth information of a market instrument in accordance with an embodiment of the disclosed subject matter.

In another aspect of the disclosed subject matter, systems and methods for displaying market depth information can include generating both a graphical representation of historical market depth (e.g., as disclosed herein with reference to FIGS. 1-2), and a graphical representation of current market depth information with an expected profile overlay (e.g., as disclosed herein with reference to FIGS. 3-5). For example, a single computing device (e.g., computing device 150) can be configured as a trading workstation and can display each graphical representation in a separate frame or window of the display, or can be configured to alternatively display one or the other. The computing device 105 can be configured to allow a trader to select which graphical representations to display as desired, along with other information conventionally displayed in connection with electronic trading, such as level 1 market information, charts, technical, and the like. Additionally, one of skill in the art will appreciate that the techniques and features of embodiments described herein with reference to FIGS. 1-2 can be applied to the embodiments described with reference to FIGS. 3-5 and vice versa.

As described above in connection with certain embodiments, certain components, e.g., computing device 150 and exchange 170 can include a computer or computers, processor, network, mobile device, cluster, or other hardware to perform various functions. Moreover, certain elements of the disclosed subject matter can be embodied in computer readable code which can be stored on computer readable media and which when executed can cause a processor to perform certain functions described herein. In these embodiments, the computer and/or other hardware play a significant role in permitting the system and method for displaying market depth information. For example, the presence of the computers, processors, memory, storage, and networking hardware provides the ability to display market depth information in a more efficient manner. Moreover, the display of market depth information, cannot be accomplished with pen or paper, as such information is received over a network in electronic form.

Additionally, as described above in connection with certain embodiments, certain components can communicate with certain other components, for example via a network, e.g., the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A system for displaying market depth information, comprising:
   a computing device including one or more processors and a memory configured to:
      receive, over a network, market depth information for a market instrument, said market depth information including bid and ask order metrics at corresponding prices of the market instrument;
      generate a graphical representation to be displayed on a display device of the market depth information having at least one of a first axis corresponding to the bid and ask order metrics of the market instrument and a second axis corresponding to price of the market instrument,
   wherein the graphical representation further comprises a scroll bar adapted to accept a user input corresponding to a desired zooming action;
      split the second axis into intervals corresponding to price;
      generate an expected profile including one or more expected metrics corresponding to one or more of the bid and ask order metrics based on an expected volume corresponding to the one or more of the plurality of bid and ask order volumes;
      align the expected profile along one of the first axis or the second axis of the graphical representation of the market depth information, wherein differences between the one or more expected metrics and the corresponding bid and ask order metrics graphically reveal price information;
      receive an input for an order from input devices at a selected price;
      determine a volume for the order based on the input from the input devices, wherein the volume for the order is based on a difference between an available volume at the selected price and the expected profile if an available volume is lower than the expected profile;
      detect an input on a location of the second axis corresponding to the selected price;
      launch an instant order corresponding to the selected price upon detecting the input on the location;
      submit the order at the selected price and at the volume for the order to execute a trade;
      compare the expected profile with the market depth information; and
      identify a price at which the difference between the available volume corresponding to the price and the expected profile is greatest;
   wherein the display device is communicatively coupled to the computing device and based on the market depth information received is configured to:
      display a trade entry dialog within a window for confirmation or alteration of order details upon detecting the input on the location; and
      display, for each of the intervals on the second axis, a graphical feature extending along the first axis by a distance corresponding to a total order volume for an interval corresponding to price within the window.

2. The system of claim 1, wherein the graphical representation includes the first axis and the second axis, the first axis corresponds to the bid and ask order metrics of the market instrument and the second axis corresponding to price of the market instrument, wherein differences between the one or more expected metrics and the corresponding bid and ask order metrics graphically reveal price information, wherein the graphical representation of the market depth data comprises an expected volume corresponding to one or more of a bid and ask order volume, wherein the expected volume corresponds to the bid order volumes displayed adjacent the expected volume corresponding to the ask order volumes within the window, and wherein the expected profile is displayed as a first layer superimposed over the expected volume corresponding to the one or more of the bid and ask order volumes.

3. The system of claim 2, wherein the graphical representation of the market depth information further comprises a graph or one or more buttons or links or features for accepting a trade price input.

4. The system of claim 3, wherein the computer display device is further configured to display error bars corresponding to at least one of a highest expected metric and a lowest expected metric for the one or more bid and ask order metrics as a second layer superimposed over the expected profile.

5. The system of claim 1, wherein the bid and ask order metrics include, for each corresponding price, at least one of one or more of order volume at the corresponding price, number of orders available at the corresponding price, and consideration of orders available at the corresponding price, and wherein the one or more expected metrics include at least one of expected number of orders and expected consideration of orders.

6. The system of claim 1, wherein the computing device is further configured to: accept an input for an order at a selected volume; and create the order at the selected volume and the identified price.

7. The system of claim 1, wherein the display device is further configured to:
   display the graphical representation of the market depth information and the expected profile to identify unusual trading patterns and market depth history or to facilitate the submission of the order and the execution of the trade.

8. A method for displaying market depth information, comprising:
   receiving, at a computing device which is communicatively coupled with a display device, market depth information for a market instrument, said market depth information including bid and ask order metrics at corresponding prices of the market instrument;
   generating a graphical representation to be displayed on the display device of the market depth information having at least one of a first axis a second axis, wherein the graphical representation further comprises a scroll bar adapted to accept a user input corresponding to a desired zooming action;
   splitting the second axis into intervals corresponding to price;
   generating an expected profile including one or more expected metrics corresponding to one or more of the bid and ask order metrics based on an expected volume corresponding to the one or more of the plurality of bid and ask order volumes;
   aligning the expected profile along one of the first axis or the second axis of the graphical representation of the market depth information;
   receiving an input from input devices for an order at a selected price;

determining a volume for the order based on the input from the input devices, wherein the volume for the order is based on a difference between an available volume at the selected price and the expected profile if an available volume is lower than the expected profile;

detecting an input on a location of the second axis corresponding to the selected price;

launching an instant order corresponding to the selected price upon detecting the input on the location;

submitting the order at the selected price and at the volume for the order to execute a trade;

comparing the expected profile with the market depth information;

identifying a price at which the difference between the available volume corresponding to the price and the expected profile is greatest; and displaying on the display device:
 a trade entry dialog within a window; and
 for each of the intervals on the second axis, a graphical feature extending along the first axis by a distance corresponding to a total order volume for an interval corresponding to price within the window.

9. The method of claim 8, wherein the graphical representation includes the first axis and the second axis, the first axis corresponds to the bid and ask order metrics of the market instrument and the second axis corresponding to price of the market instrument, wherein differences between the one or more expected metrics and the corresponding bid and ask order metrics graphically reveal price information, wherein the graphical representation of the market depth data comprises an expected volume corresponding to one or more of a bid and ask order volume, wherein the expected volume corresponds to the bid order volumes displayed adjacent the expected volume corresponding to the ask order volumes within the window, and wherein the expected profile displayed as a first layer superimposed over the expected volume corresponding to the one or more of the bid and ask order volumes.

10. The method of claim 8, wherein the graphical representation of the market depth information further comprises a graph, and the graphical representation comprises one or more buttons or links or features for accepting a trade price input.

11. The method of claim 10, further comprising: displaying, on the display device, error bars corresponding to at least one of a highest expected metric and a lowest expected metric for the one or more bid and ask order metrics as a second layer superimposed over the expected profile and within the window.

12. The method of claim 8, wherein the bid and ask order metrics include, for each corresponding price, at least one of one or more of order volume at the corresponding price, number of orders available at the corresponding price and consideration of orders available at the corresponding price, and wherein the one or more expected metrics include at least one of expected number of orders and expected consideration of orders.

13. The method of claim 8, wherein generating the graphical representation of the market depth information includes generating a graph, whereby the second axis corresponding to price is split into intervals, each interval associated with a graphical element extending along the first axis by a distance corresponding to a total order volume for an interval corresponding to price.

14. The method of claim 8, further comprising: displaying, on the display device, the graphical representation of the market depth information and the expected profile to identify unusual trading patterns and market depth history or to facilitate the submission of the order and the execution of the trade.

15. The method of claim 8, further comprising: receiving an input for an order at a selected volume; and creating the order at the selected volume and the identified price.

16. A non-transitory computer-readable medium storing instructions that, when executed by a processor, cause a computer system to display market depth information, by performing the steps of:

receiving, over a network, market depth information for a market instrument, said market depth information including bid and ask order metrics at corresponding prices of the market instrument;

generating a graphical representation to be displayed on a display device of the market depth information having at least one of a first axis and a second axis, wherein the graphical representation further comprises a scroll bar adapted to accept a user input corresponding to a desired zooming action;

splitting the second axis into intervals corresponding to price;

generating an expected profile including one or more expected metrics corresponding to one or more of the bid and ask order metrics based on an expected volume corresponding to the one or more of the plurality of bid and ask order volumes;

aligning the expected profile along one of the first axis or the second axis of the graphical representation of the market depth information;

receiving an input from input devices for an order at a selected price;

determining a volume for the order based on the input from the input devices, wherein the volume for the order is based on a difference between an available volume at the selected price and the expected profile if an available volume is lower than the expected profile;

detecting an input on a location of the second axis corresponding to the selected price;

launching an instant order corresponding to the selected price upon detecting the input on the location;

submitting the order at the selected price and at the volume for the order to execute a trade;

comparing the expected profile with the market depth information;

identifying a price at which the difference between the available volume corresponding to the price and the expected profile is greatest; and displaying on the display device:
 a trade entry dialog within a window; and
 for each of the intervals on the second axis, a graphical feature extending along the first axis by a distance corresponding to a total order volume for an interval corresponding to price within the window.

\* \* \* \* \*